United States Patent [19]

Saito

[11] 4,087,845

[45] May 2, 1978

[54] TAPE PAD SUPPORT ASSEMBLY FOR USE IN MAGNETIC TAPE CASSETTES

[75] Inventor: Shoichi Saito, Tokyo, Japan

[73] Assignee: Olympus Optical Co., Ltd., Tokyo, Japan

[21] Appl. No.: 707,631

[22] Filed: Jul. 22, 1976

[30] Foreign Application Priority Data

Jul. 29, 1975 Japan .................. 50-104897[U]
Jul. 31, 1975 Japan .................. 50-106794[U]
Dec. 13, 1975 Japan .................. 50-168247[U]
Apr. 12, 1976 Japan .................. 51-45294[U]

[51] Int. Cl.² .................. G11B 15/08; G11B 15/60
[52] U.S. Cl. .................. 360/130; 360/96; 360/132
[58] Field of Search .................. 360/130, 132, 96; 242/197-199

[56] References Cited

U.S. PATENT DOCUMENTS

| 2,644,690 | 7/1953 | Krag | 360/130 |
| 2,682,410 | 6/1954 | Bauman | 360/130 |
| 3,126,163 | 3/1964 | Knox | 360/132 |
| 3,682,468 | 8/1972 | Zwetzig et al. | 360/132 |
| 3,751,043 | 8/1973 | Bracci | 360/132 |
| 3,932,893 | 1/1976 | Singer | 360/130 |
| 3,940,799 | 2/1976 | Matsumoto et al. | 360/132 |

FOREIGN PATENT DOCUMENTS 16,344  5/1971  Japan .................. 360/130

Primary Examiner—Alfred H. Eddleman
Attorney, Agent, or Firm—Ostrolenk, Faber, Gerb & Soffen

[57] ABSTRACT

A tape pad support assembly includes a leaf spring which is internally housed within a magnetic tape cassette for supporting a tape pad or pads which are urged to cause an abutment of a magnetic tape against a magnetic head. The leaf spring is provided with a pair of spaced fulcrums, and each of its free ends on which a tape pad is secured is formed in a pair of elongate strips. The spring is disposed between a spring abutment and a magnetic tape which runs across a window slot or slots formed in the front end face of the cassette.

6 Claims, 21 Drawing Figures

TAPE PAD SUPPORT ASSEMBLY FOR USE IN MAGNETIC TAPE CASSETTES

BACKGROUND OF THE INVENTION

The invention relates to a tape pad support assembly for use in a magnetic tape cassette, in particular, of a miniature size which is used in a miniature cassette tape recorder.

As is well known, a tape pad support assembly in a magnetic tape cassette comprises a leaf spring which is disposed so as to extend on the rear side of a portion of a magnetic tape which extends along a plurality of window slots formed in the front end face of a tape cassette, thereby serving to urge the magnetic tape against a magnetic head or heads which are inserted into the cassette through the window slot or slots.

Figure 1:
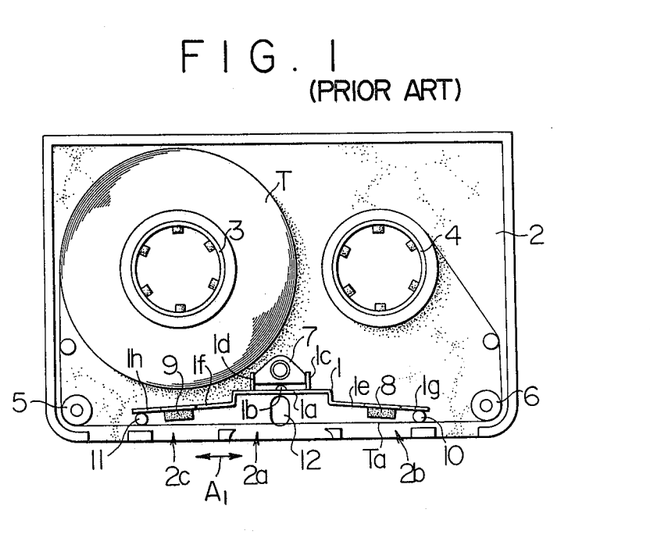
FIG. 1 is a plan view of a conventional tape pad support assembly.
Figure 2:
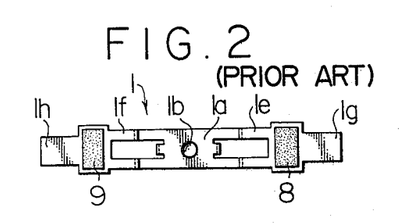
FIG. 2 is a front view of a tape pad carrying leaf spring shown in FIG. 1.

The construction of a conventional pad support spring is illustrated in FIGS. 1 and 2. FIG. 1 shows a plan view of a cassette half 2, in particular, of a microcassette type, in which a pad support spring 1 is mounted. The cassette internally houses a pair of tape supply and take-up hubs 3, 4 which are rotatably mounted therein. A magnetic tape T has its one end secured to the hub 3 and then disposed thereon by being spirally wound thereon. Subsequently, the tape is guided by a pair of guide rollers 5, 6 so as to extend in a taut condition along a plurality of window slots 2a, 2b and 2c which are formed in the front end face of a cassette, and its opposite end is anchored to the other tape hub 4. The window slot 2a is adapted to receive a pinch roller while the remaining window slots 2b, 2c are adapted to receive magnetic heads.

The pad support spring 1 is disposed on the back side of a portion Ta of the tape which extends along the front end face of the cassette, and extends parallel to the direction of tape running. The spring is formed of a very thin resilient sheet material, and is disposed so that its plane is in parallel relationship with the surface of the tape portion Ta. The leaf spring has a central portion 1a which is retracted inward into the cassette in a channel configuration in order to avoid any interference with a capstan aperture 12 which is located in the cassette in alignment with the central window slot 2a. A projection 1b is centrally formed on the leaf spring and extends inward into the cassette to bear against a spring abutment 7 which is integrally formed with the cassette half 2. A pair of tabs 1c, 1d extend in the same direction as the projection 16 on the opposite sides thereof to engage the opposite lateral sides of the abutment 7, thereby preventing an axial displacement of the spring in the direction of arrows $A_1$.

A pair of pads 8, 9 are adhesively mounted on a pair of end portions 1e, 1f of the spring so as to be in alignment with the respective slots 2b, 2c. As shown in FIG. 2, the free ends 1g, 1h of the spring have a reduced width, and bear against a pair of stop pins 10, 11 (see FIG. 1), thereby controlling the resilience which acts in a direction toward the tape portion Ta.

Figure 3:
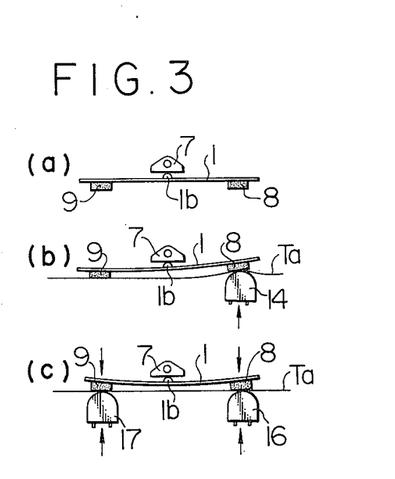

Considering the operation of the leaf spring, it is diagrammatically shown in FIGS. 3(a)–3(c). In a single head system, a magnetic head 14 is inserted through one of the window slots toward one of the pads, for example, pad 8 as illustrated in FIG. 3(b). When the tape cassette is removed and inverted upside down, the same head 14 will be advanced toward the other pad 9. In each of these instances, the pads 8, 9 urge the magnetic tape portion Ta against the surface of the magnetic head 14.

In a two head system in which a pair of magnetic heads 16, 17 which may be a combination of a record/playback head and an erase head, for example, are advanced through the window slots toward the pads 8, 9 so that they move into abutting relationship with the tape portion Ta, as shown in FIG. 3(c), the illustrated pad support spring 1 exhibits a poor response. Specifically, if both heads 16, 17 are simultaneously advanced into contact with the tape Ta, the resilience of spring 1 will act relatively uniformly through the both pads 8, 9. However, it is very difficult, if not impossible, to bring both heads into engagement with the tape portion Ta simultaneously, and usually one of the heads will precede the other in engaging with the spring through the associated pad. As illustrated in FIG. 3(b), the spring 1 will rotate counter-clockwise about the fulcrum 1b so that the other head which lags in engaging with the tape will be subjected to an increased resilience of the spring which results from the counter-clockwise rotation thereof, resulting in an unbalanced contact pressure between the respective heads and the tape. This means that the magnetic head which lags in engaging with the tape must be advanced with an increased force. It will be also appreciated that the above disadvantage will be even more aggravated if the projection 1b which defines the fulcrum of the spring 1 has a larger dimension.

Figure 4:
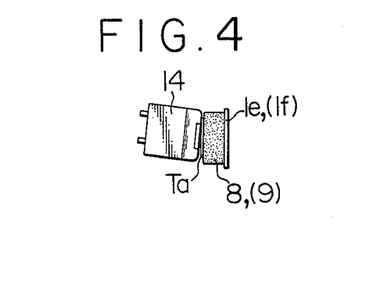
FIG. 4 is a side elevation of a magnetic head, illustrating one possible manner of its bearing against the leaf spring shown in FIG. 2.

Another consideration to be paid with respect to the head and support arrangement is the fact that a magnetic head is not always advanced into the cassette in a horizontal plane, but may be advanced with an angle of inclination with respect to the horizontal, as illustrated in FIG. 4. When a head 14 assumes a skewed position when it is being inserted, the tape portion Ta and the associated pad, for example, pad 8, will be pressed in a corresponding manner to assume a skewed position. Since the spring 1 comprises a one-piece leaf spring, a skewed position of one free end 1e will be transmitted to the other free end 1f, resulting in a skewed position of the other pad 9. If the other head is inserted in a horizontal plane under this condition, the tape will engage this head in a skewed position into which it is forced by the associated pad, thus resulting in a failure to achieve close contact between the tape and the head surface and also causing a strain to be produced in the tape.

The described pad support assembly has a further disadvantage in that the fulcrum of the spring 1 is formed by the tip of the projection 1b extending rearwardly from the spring and thus is situated at a rearwardly retracted position relative to the spring 1, the distance between the pad and the fulcrum is increased and the pad cannot respond immediately, resulting in a poor response of the pad as the magnetic head or heads are being advanced into the associated window slots. To remove this difficulty, it is desirable that the distance between the fulcrum of the spring and the pad be minimized.

SUMMARY OF THE INVENTION

It is a primary object of the invention to provide a tape pad support assembly for use in a magnetic tape cassette which eliminates the above disadvantages of the prior art by the provision of a pair of spaced fulcrums centrally arranged on a leaf spring which carries tape pads.

It is another object of the invention to provide a tape pad support assembly including a pad carrying leaf spring, the free ends of which are formed into a pair of elongate strips on which the tape pads are mounted, thus aiding the pads to conform to the head surface.

It is still another object of the invention to provide a tape pad support assembly including a pad carrying leaf spring and in which a fulcrum member is placed in opposing relationship with the rear side of the central portion of the leaf spring and a projection is formed on the fulcrum member so as to extend toward the rear side of the spring, thus displacing the fulcrum of the spring thereto to reduce the distance between the fulcrum and a pad which is adhesively secured thereto.

In accordance with the invention, the resilience of the pad carrying leaf spring is effectively applied through the pads, thereby greatly improving the conformity or the tracking capability of the tape pads with respect to the magnetic heads. Specifically, a pair of fulcrums are formed on the spring so that one of the fulcrums is operatively associated with one of the pads which is located near said one fulcrum while the other fulcrum is operatively associated with the other pad, thus making the respective pads independent from the other in order to avoid an unbalanced pad pressure in a two head system. Since the free end of the leaf spring on which each of the pads is mounted is formed into a pair of elongate strips, a skewed position of one of the pads which is caused by advancement of a skewed magnetic head is prevented from being transmitted to the other pad.

The provision of a fulcrum member in opposing relationship with the rear side of the pad carrying leaf spring and carrying a projection enables the fulcrum to be displaced in a forward direction onto the spring, thereby reducing the distance between the fulcrum and the pad to improve the response of the pad with respect to the magnetic head.

BRIEF DESCRIPTION OF THE DRAWINGS

FIGS. 3(a), (b) and (c) are diagrammatic views of the tape pad support assembly shown in FIG. 1, illustrating the manner of operation thereof;

FIGS. 17(a) and (b) are diagrammatic views illustrating the operation of the leaf spring shown in FIG. 16;

DETAILED DESCRIPTION OF PREFERRED EMBODIMENTS OF THE INVENTION

Figure 5:
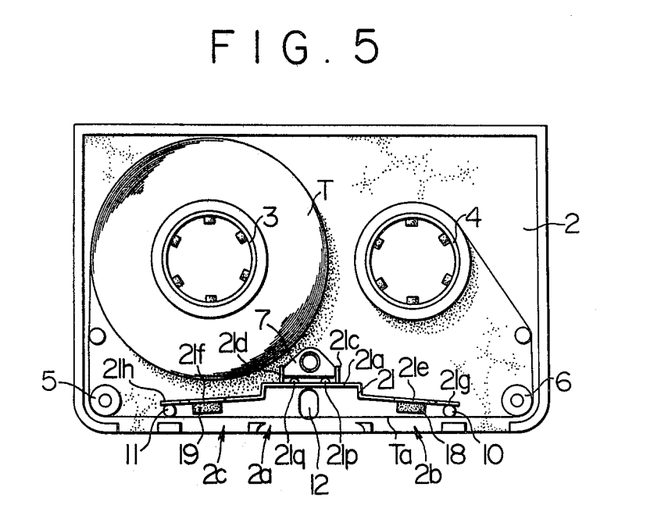
FIG. 5 is a plan view of a tape pad support assembly constructed in accordance with one embodiment of the invention.
Figure 6:
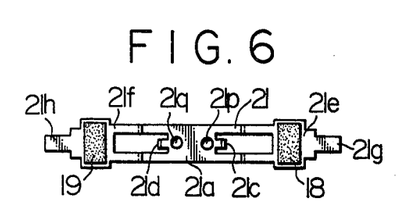
FIG. 6 is a front view of the leaf spring shown in FIG. 5.

Referring to FIG. 5, which shows one embodiment of the invention, there is shown a tape pad carrying leaf spring 21 which is disposed on the rear side of the tape portion Ta. The spring 21 is formed of a very thin leaf spring material, and has its plane disposed in parallel relationship with the surface of the tape portion Ta. The leaf spring 21 has a central portion 21a which is recessed inward into the cassette in a channel configuration and which is formed with a pair of nipples 21p, 21q which extend inward into the cassette to define the fulcrums of the spring. The nipples 21p, 21q have a smaller dimension than the conventional projection 1b shown in FIGS. 1 to 3, and is shaped for bearing engagement against a spring abutment 7 which is integrally formed with the cassette half 2. As usual, a pair of tabs 21c, 21d extend from the central portion 21a inward into the cassette to engage the opposite lateral sides of the abutment 7, thereby preventing an axial movement of the spring 21. A pair of pads 18, 19 are adhesively secured to free end portions 21e, 21f which are further removed from the central portion 21a on the opposite sides thereof. The pad 18 is located so as to be in alignment with the window slot 2b (see FIG. 2) while the other pad 19 is located in alignment with the other window slot 2c (also see FIG. 2). Free ends 21g, 21h have a reduced width as shown in FIG. 6, and bear against a pair of stop pins 10, 11 (see FIG. 5), thereby controlling the resilience of the spring. A capstan aperture 12 is shown in FIG. 5.

With the pad support spring 21, when one of the magnetic heads is advanced into the window slot 2b into abutting relationship with a magnetic tape which is urged thereagainst by the pad 18, the spring 21 will rotate about the nipple 21p which then functions as the fulcrum. When the other head (not shown) is advanced into the other window slot 2c in a lagging timing relationship with the first head, the spring will rotate clockwise about the other nipple 21q which then functions as the fulcrum. At this time, the force of the reaction which was acting on the pad 19 when the nipple 21p functioned as the fulcrum will be cancelled as a result of differential lever ratios from the respective fulcrums of the spring 21. This means that the lagging head can be advanced into the cassette with an equal force as used in advancing the first head, and in addition a balanced pressure of contact is achieved between the tape and the respective pads.

Figure 7:
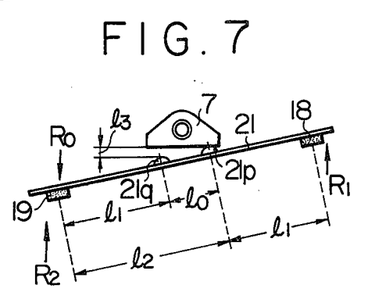
FIG. 7 is a diagrammatic view of the leaf spring shown in FIG. 6.

Referring to FIG. 7 for a more detailed consideration of such function, the distance between the nipple 21p and the central portion of pad 18 is represented by $l_1$ as is the distance between the nipple 21$q$ and the pad 19. The spacing between the nipples 21$p$ and 21$q$ is represented by $l_0$. When the pad 18 is driven inward with a force $R_1$, there will be produced a force of reaction $R_O$ applied to the pad 19 which results from a counterclockwise rotation of the spring 21 about the nipple 21$p$ as the fulcrum. The lever ratio of pads 18, 19 from the nipple 21$p$ as the fulcrum of the spring 21 will be $l_1 \cdot l_2$, where $l_2 = l_1 + l_0$. When the pad 19 is driven inward, the force of reaction $R_0$ will be cancelled by the presence of the distance $l_0$. Thus, $R_1/l_1 = R_2/l_2$. In other words, we may have a drive on the pad 19 which is substantially balanced with the drive applied to the pad 18.

A reduced dimension of the nipples 21$p$, 21$q$ which function as the fulcrums enables a stroke $l_3$ through which the spring 21 rocks with respect to the spring abutment 7 to be minimized, improving the response of the spring 21 as it rocks in the opposite direction. As an overall effect, the tracking capability of the pads with respect to the heads is greatly improved.

It is found that the pad carrying spring which is provided with a pair of fulcrums achieves its maximum effect when its thickness, the width of its central portion, and the width of the transition areas between the central portion and the end portions satisfy a relationship as represented by the following inequality:

$$4t < A < B$$

It should be noted that where the central portion or the end portion is formed into more than one parts, their width should be represented by the sum of widths of respective parts.

Figure 8:
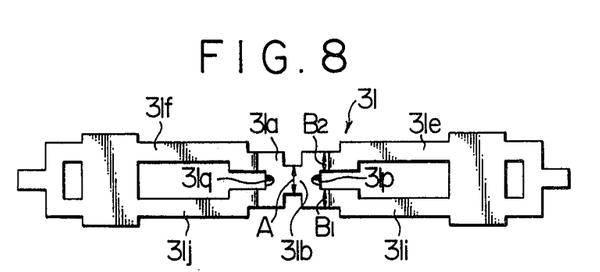
FIG. 8 is a front view of another form of tape pad carrying leaf spring in accordance with the invention.
Figure 9:
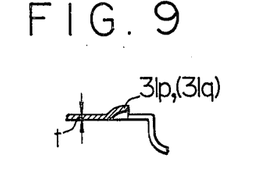
FIG. 9 is an enlarged cross section of a projection shown in FIG. 8.

One form of tape pad carrying leaf spring 31 which satisfies the above requirement is shown by a front view of FIG. 8. The spring 31 has a central portion 31$a$, the center 31$b$ of which is notched along its opposite edges to have a width A. On one side, the central portion 31$a$, is contiguous with an end portion which is formed as a pair of vertically spaced elongate strips 31$e$, 31$i$, which on the opposite side, it is contiguous with another end portion which is formed as a pair of vertically spaced elongate strips 31$f$, 31$j$. In the transition region with the central portion 31$a$, the upper strips 31$e$, 31$f$ have a width $B_2$ while the lower strips 31$i$, 31$j$ have a width $B_1$. Though each of $B_1$ and $B_2$ has a value which is less than A, the sum of $B_1$ and $B_2$, which represents the width B of the end portions in their transition area with the central portion 31$a$, is greater than A. A pair of nipples 31$p$, 31$q$ are formed by embossing the spring material along the opposite lateral edges of the central portion 31$b$, as shown in FIG. 9. The leaf spring 31 has a thickness $t$ of a value such that four times $t$ is still less than the value of A. In this manner, the spring 31 acts most effectively by satisfying the above requirement.

Figure 10:
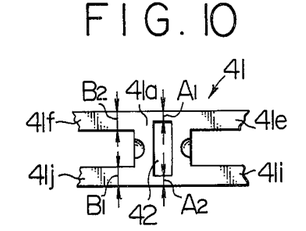
FIG. 10 is an enlarged fragmentary view of still another form of the tape pad carrying leaf spring according to the invention.

FIG. 10 is an enlarged fragmentary front view of another form of tape pad carrying leaf spring 41, which includes a central portion 41$a$ which is centrally formed with an elongate square shaped slot 42. Thus the width of the central portion 41$a$ is represented by the sum of $A_1$ and $A_2$ which represents the width of its upper and lower marginal portions, respectively. The end portions which extend in the opposite directions from the central portion 41$a$ are each formed as a pair of elongate strips. Upper strips 41$e$, 41$f$ have a width of $B_2$ in its transition area with the central portion while lower end portions 41$i$, 41$j$ have a width $B_1$ in its transition area with the central portion. It will be noted that both $B_1$ and $B_2$ are greater than $A_1$ and $A_2$, respectively, and hence their sum is greater than A. The thickness $t$ of the spring 41 has a value such that $4t < A$. The spring 41 thus again satisfies the above requirement.

Figure 11:
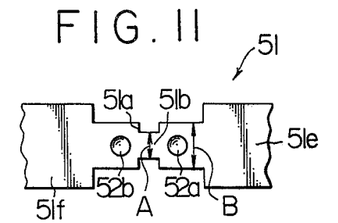
FIG. 11 is an enlarged fragmentary view of a further form of the tape pad carrying leaf spring according to the invention.

FIG. 11 is an enlarged fragmentary front view of a further form of tape pad carrying leaf spring 51, which includes a central portion 51$a$, the center 51$b$ of which is notched in both its upper and lower edges as in the example shown in FIG. 8, thus having a width A. In the example shown in FIG. 11, end portions 51$e$, 51$f$ are solid and have a width B in its transition area with the central portion 51$a$ which is greater than the width A. The thickness $t$ of the spring 51 is chosen such that $4t < A$. A pair of nipples 52$a$, 52$b$ are shown as formed on the opposite sides on the center 51$b$ of the central portion 51$a$. Again, the spring 51 satisfies the above requirement.

Figure 12:
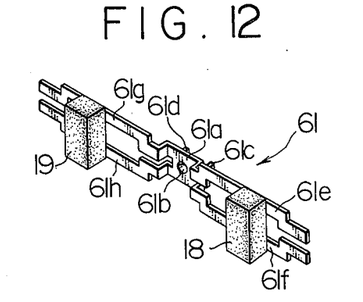
FIGS. 12, 13 and 14 are perspective views illustrating additional forms of the tape pad carrying leaf spring according to the invention.

FIG. 12 is a perspective view of an additional form of tape pad carrying leaf spring 61 constructed according to the invention. The spring 61 includes a central portion 61$a$ which is formed in a conventional manner. Thus, the central portion 61$a$ is recessed into the cassette in a channel configuration and is centrally formed with a nipple 61$b$ which defines the fulcrum. A pair of tabs 61$c$, 61$d$ are formed on the central portion on the opposite sides of the nipple 61$b$ and extend in a rearward direction. However, a distinction is found between the spring 61 and a conventional spring 1 as shown in FIGS. 1 and 2 in that the end portions of the spring 61 which are contiguous with the central portion 61$a$ are formed into a pair of elongate strips. The right-hand end portion comprises a pair of upper and lower end portions 61$e$, 61$f$ while the left-hand end portion also comprises a pair of upper and lower end portions 61$g$, 61$h$. A pad 18 is adhesively secured bridging across the end portions 61$e$, 61$f$, and another pad 19 is adhesively secured bridging across the end portions 61$g$, 61$h$.

With the spring 61 thus constructed, the individual end portions are free to move independently from the influence of movement of the end portion located on the opposite side of the central portion 61$a$. This means that if the pad 18 becomes skewed, no influence is exerted or transmitted to the other pad 19 through the spring 61. In addition, the formation of a pad support in a pair of strips permits the tape to be closely and tightly held against a head surface if the head assumes a skewed position.

Figure 13:
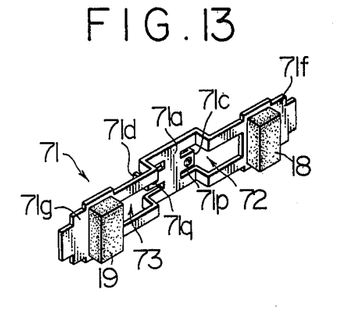

FIG. 13 is a perspective view of a further form of tape pad carrying leaf spring 71, which includes a central portion 71$a$ having a pair of nipples 71$p$, 71$q$ formed thereon. As in a conventional arrangement, the central portion 71$a$ is recessed into the cassette in a channel configuration, and the nipples 71$p$, 71$q$ which define the fulcrums are located adjacent to the opposite lateral sides of the central portion and extend in the rearward direction. On the outer sides of the respective nipples 71$p$, 71$q$, there are tabs 71$c$, 71$d$ which are folded from the plane of the central portion to extend rearwardly for engagement with the opposite lateral sides the spring abutment 7 (see FIGS. 1 and 5). A pair of pads 18, 19 are adhesively secured across the end portions 71$f$, 71$g$. The end portions are notched as shown at 72, 73, the notches extending from adjacent to the respective pads 18, 19 to positions adjacent to the respective nipples 71$p$, 71$q$.

With this spring 71, when the pad 18 is initially driven by one of the magnetic heads (not shown), the nipple 71$p$ functions as the fulcrum of the spring, and when the other pad 19 is subsequently driven by the other head (not shown), the nipple 71q functions as the funcrum of the spring. The provision of the notches 72, 73 improves the resilient action of the end portion 71f, 71g. Since the respective fulcrums are spaced apart from each other, the occurrence of reaction is prevented if one of the heads precedes the other, thus allowing both heads to be advanced into the cassette with an equal force.

Figure 14:
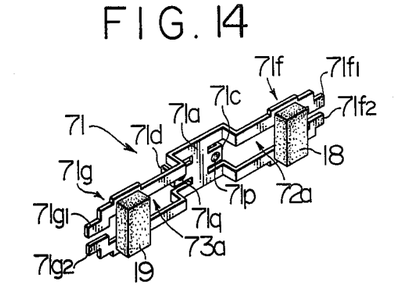

In a modification shown in FIG. 14, the free ends 71f, 71g of the spring 71 shown in FIG. 13 are also formed as a pair of strips. Specifically, the right-hand free end 71f is formed as a pair of elongate strips 71f1, 71f2, and the left-hand free end 71g is formed as a pair of elongate strips 71g1, 71g2. The pad 18 is adhesively secured across the strips 71f1, 71f2, and the pad 19 is similarly adhesively secured across the strips 71g1, 71g2. Notches 72a, 73a which are formed between the strips extend beyond the nipples 71p, 71q. In other respects, the arrangement is similar to that shown in FIG. 13. The spring 71 again achieves the similar effect as that achieved by the above arrangements. Since the free ends are each separated into a pair of strips, the influence of one of the free ends upon the other is substantially completely avoided. Since the notches 72a, 73a extend into the central portion 71a beyond the nipples 71p, 71q, (which is also the case in FIG. 13) the effective spring length is increased, enhancing a cushioning action as it urges the respective pads against the associated heads.

Figure 15:
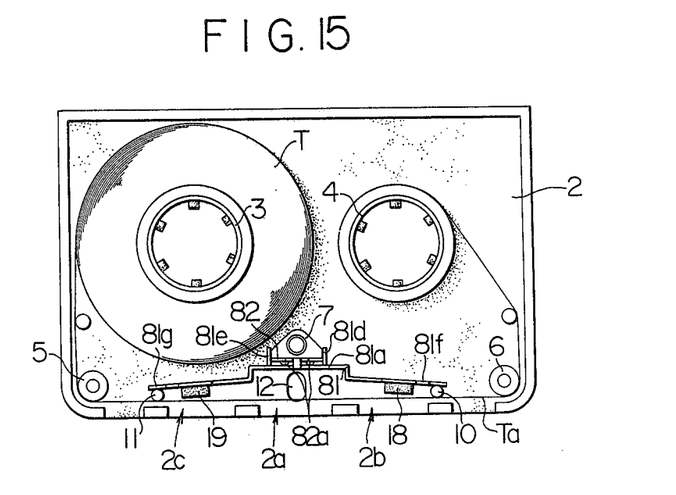
FIG. 15 is a plan view of a tape pad support assembly constructed in accordance with another embodiment of the invention.
Figure 16:
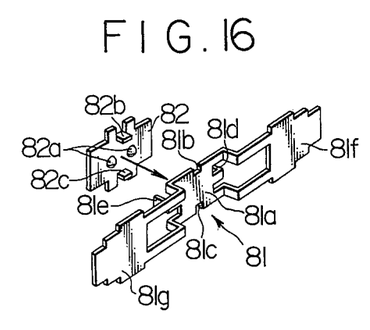
FIG. 16 is a perspective view of the tape pad carrying leaf spring shown in FIG. 15.

Referring to FIGS. 15 and 16, there is shown a further embodiment of the invention which comprises a tape pad carrying leaf spring 81. The spring 81 has its fulcrums defined by a fulcrum member 82, which is disposed on the rear side of a central portion 81a of the leaf spring 81 and which is provided with a pair of dowels 82a which extend from the central region thereof toward the leaf spring 81 to define the fulcrums for the leaf spring 81. As shown in FIG. 16, the fulcrum member 82 is formed with a pair of centrally located tabs 82b, 82c extending from the upper and lower edges thereof and toward the front end of a cassette and which are fitted into a pair of notches 81b, 81c centrally formed in the upper and lower edges of the leaf spring 81, thus integrally connecting the fulcrum member 82 with the leaf spring 81. A spring abutment 7 (see FIG. 15) is integrally formed with the cassette half 2 and is disposed within the cassette so as to be located behind the member 82. When the member 82 is integrally connected with the leaf spring 81, the dowels 82a thereon have their tip end held in abutting relationship against the rear surface of the central portion 81a of the leaf spring 81. A pair of tabs 81d, 81e which are formed by bending from the plane of the central portion 81a toward the interior of the cassette engage the opposite lateral sides of the spring abutment 7, thereby preventing a lengthwise displacement of the spring 81. The spring 81 includes a pair of free end portions 81f, 81g which extend in opposite directions from the central portion 81a and to which a pair of pads 18, 19 are adhesively secured.

Figure 17:
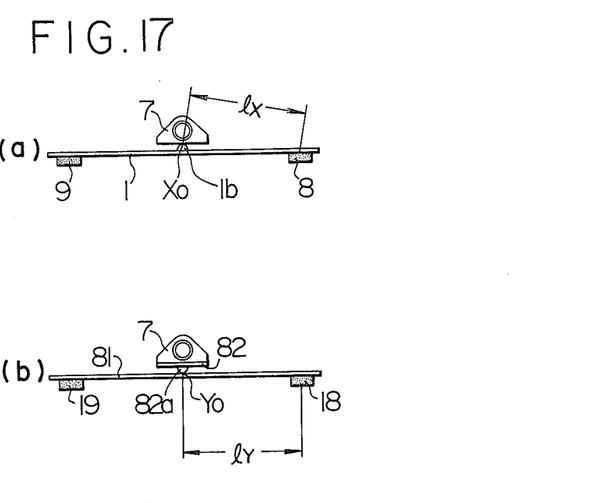

A comparison of the leaf spring of this embodiment with a prior art arrangement is illustrated in FIG. 17 where the leaf spring 81 is shown as including a single dowel 82a. In a prior art arrangement illustrated in FIG. 17(a), projection 1b on the leaf spring 1 bears against the spring abutment 7 at a point $x_0$. In the arrangement of the invention illustrated in FIG. 17(b), the dowel 82a on the fulcrum member 82 bears against the leaf spring 81 at a point $y_0$, and this means that the fulcrum is displaced forwardly onto the spring 81, by an amount corresponding to the height of the dowel. As a consequence, the distance between the fulcrum and one of the pads is by $(l_x - l_y)$ reduced in the arrangement of the invention where $l_x$ represents such distance in the prior art arrangement and $l_y$ that in the arrangement of the invention. It will be appreciated that a reduction in the distance between the fulcrum and the pad improves the response of the pad carrying spring with respect to the magnetic head which is in abutting relationship with the pad. An improved response of the spring with respect to the magnetic head represents an improved tracking capability thereof, thus achieving a favorable condition for the tape recording/playback operation. The omission of any nipple or dowel on the pad carrying leaf spring permits an improvement in the accuracy with which it is manufactured as a result of eliminating the pressing step otherwise required for forming the dowels.

Figure 18:
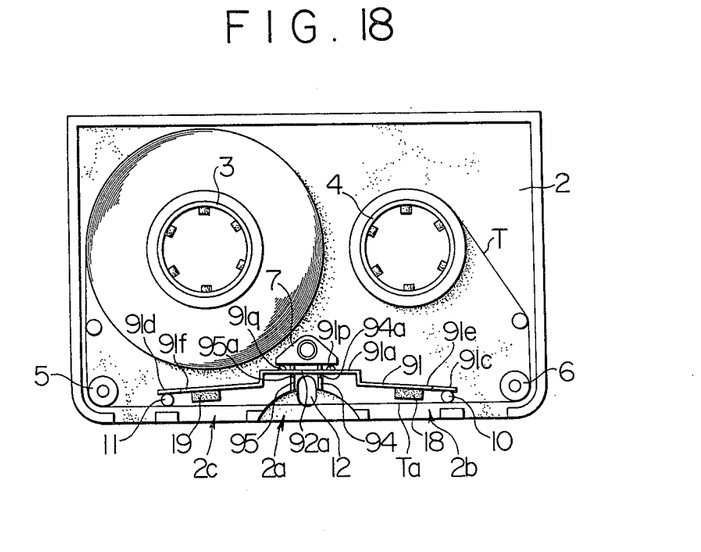
FIG. 18 is a plan view of a tape pad support assembly constructed in accordance with a further embodiment of the invention.
Figure 19:
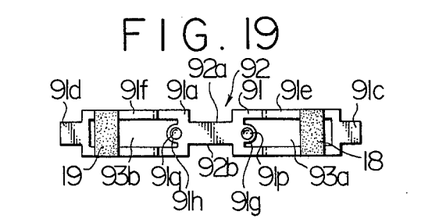
FIGS. 19 and 20 show a front view and a perspective view, respectively, of the tape pad carrying leaf spring shown in FIG. 18.
Figure 20:
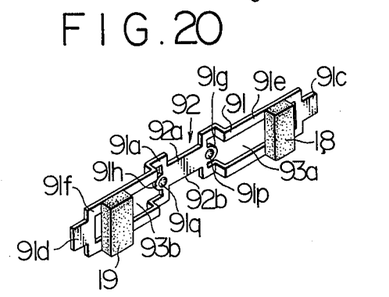

Referring to FIG. 18, there is shown a further embodiment of the invention which comprises a tape pad carrying leaf spring 91. The spring 91 includes a central portion 91a which is recessed into the cassette in a channel configuration, and the upper and lower edges of which are formed with a pair of notches 92a, 92b, which constitute together a detent 92, as shown in FIGS. 19 and 20. A pair of end portions 91e, 91f extend symmetrically in opposite directions from the detent 92 and are each formed with a pair of transversely extending square slots 93a, 93b. Free ends 91c, 91d of the end portions have a reduced width, and bear against a pair of stop pins 10, 11 (see FIG. 18), thereby controlling the resilience of the spring. A pair of tape pads 18, 19 are adhesively secured to the end portions 91e, 91f toward their free end so as to extend across the respective square slots 93a, 93b, in a direction perpendicular to the length of the respective end portions, these pads acting to urge the tape portion Ta against magnetic heads (not shown). A pair of ears 91g, 91h extend from the opposite lateral sides of the central portion into the square slots 93a, 93b, and carry a pair of nipples 91p, 91q on their free end which define the fulcrums of the spring 91.

Figure 21:
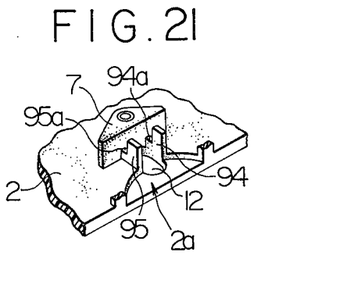
FIG. 21 is a perspective view of the spring abutment shown in FIG. 18.

As shown in FIGS. 18 and 21, a pair of ribs 94, 95 extend forwardly from the front surface of the spring abutment 7 in a manner circumscribing the capstan aperture 12. The spacing between the ribs 94, 95 is slightly less than the width of the notches 92a, 92b formed in the upper and lower edges of the leaf spring 91, and the respective ribs are formed with steps 94a, 95a in its region adjacent to the spring abutment 7. A pair of corresponding ribs which are similar to the ribs 94, 95 are also provided on the other cassette half (not shown) which is disposed in overlying relationship with the cassette half 2 to complete a cassette structure. The spring 91 is mounted in the cassette half 2 by fitting the steps 94a, 95a of the ribs into the notch 92a or 92b. When mounted in this manner, the leaf spring 91 is prevented from movement in its axial direction, back and forth and in its vertical direction while the nipples 91p, 91q bear against the front surface of the spring abutment 7 to define a pair of fulcrums of the spring 91. The described spring 91 is advantageous is reducing its manufacturing cost in that the configuration of the spring is simplified by the provision of notches 92a, 92b alone, without recourse to the tabs which are folded from the plane thereof.

What is claimed is:

1. In a magnetic tape cassette having a window slot formed centrally in the front end face of the cassette for receiving a pinch roller, a pair of window slots located symmetrically on the opposite sides of the first mentioned window slot for receiving magnetic heads, and an aperture located in the cassette toward said front end face in alignment with the window slot for the pinch roller for receiving a capstan, said cassette also including a tape supply hub carrying a length of magnetic tape disposed thereon and a tape take-up hub on which the tape is taken up after it has run along the respective window slots with its plane disposed parallel to the plane of the window slots; a tape pad support assembly comprising a spring abutment integrally formed with the cassette and located immediately behind the capstan aperture, a pad carrying leaf spring formed of a resilient sheet material and disposed on the rear side of the tape which runs along the respective window slots, the spring including a central portion on which a pair of nipples or dowels are formed for abutment against the spring abutment to define a pair of fulcrums, the spring also including a detent member located adjacent to the central portion and adapted to engage the spring abutment, and the spring further including a pair of end portions which extend from the central portion to positions behind the respective window slots associated with the magnetic heads, and a pair of tape pads secured to the end portions of the leaf spring for urging the tape against a magnetic head or heads as the latter is advanced into the associated window slot or slots.

2. A tape pad support assembly according to claim 1 in which the thickness $t$ of the leaf spring, the width A in the central region of the central portion (or the total width where the central portion is divided into more than one parts) and the width B of the end portions in their transition area with the central portion (or the total width where the end portions are divided into more than one parts) satisfy the following inequality relationship:

$$4t < A < B$$

3. A tape pad support assembly according to claim 1 in which each of the end portions are each formed into a pair of elongate strips, thus forming a notch therebetween which extends into the central portion beyond the position of the nipples or dowels.

4. A tape pad support assembly according to claim 1 in which a fulcrum for the leaf spring is established by its cooperation with a fulcrum member disposed in opposing relationship with the rear side of the central portion of the spring and having a dowel thereon which extends toward the spring, the fulcrum member being mounted on the spring so as to prevent a relative movement therebetween.

5. A tape pad support assembly according to claim 1 in which the end portions of the leaf spring are formed with transversely extending square slots, and in which nipples which define the fulcrums are formed on ears which extend from the central portion into the square slots.

6. A tape pad support assembly according to claim 1 in which the detent member is formed by a pair of notches formed in the upper and lower edges of the central portion of the leaf spring.

* * * * *